United States Patent [19]

Eipper et al.

[11] Patent Number: 5,056,840
[45] Date of Patent: Oct. 15, 1991

[54] MOTOR VEHICLE BUMPER

[75] Inventors: Konrad Eipper, Ammerbuch; Wolfgang Fischer, Leinfeiden; Wolfgang Klie, Korntal; Horst Kleiner, Stuttgart, all of Fed. Rep. of Germany

[73] Assignee: Daimler-Benz AG, Stuttgart, Fed. Rep. of Germany

[21] Appl. No.: 572,544

[22] Filed: Aug. 27, 1990

[30] Foreign Application Priority Data

Aug. 25, 1989 [DE] Fed. Rep. of Germany ....... 3928060

[51] Int. Cl.⁵ .................................................. B60R 19/24
[52] U.S. Cl. ..................................... 293/120; 293/133
[58] Field of Search .............. 293/107, 109, 120, 132, 293/133, 136

[56] References Cited

U.S. PATENT DOCUMENTS

| | | | |
|---|---|---|---|
| 3,666,310 | 5/1972 | Burgess et al. | 293/120 X |
| 3,722,876 | 3/1973 | Schwenk | 293/120 X |
| 3,860,279 | 1/1975 | Hulten | 293/109 |
| 3,888,531 | 6/1975 | Strazza et al. | 293/133 X |
| 3,926,462 | 12/1975 | Burns et al. | 293/136 |
| 4,029,350 | 6/1977 | Goupy et al. | 293/133 X |
| 4,061,384 | 12/1977 | Montgomery et al. | 293/120 X |
| 4,413,856 | 11/1983 | McMahan et al. | 293/120 X |
| 4,457,547 | 7/1984 | Sekiyama et al. | 293/120 X |
| 4,826,226 | 5/1989 | Klie et al. | 293/120 |
| 4,968,076 | 11/1990 | Kuroki | 293/109 X |

FOREIGN PATENT DOCUMENTS

| | | | |
|---|---|---|---|
| 1045183 | 12/1978 | Canada | 293/136 |
| 49614 | 4/1982 | European Pat. Off. | 293/136 |
| 2239872 | 8/1972 | Fed. Rep. of Germany | 293/136 |
| 2413772 | 3/1974 | Fed. Rep. of Germany. | |
| 199248 | 11/1983 | Japan | 293/132 |
| 202132 | 11/1983 | Japan | 293/136 |
| 94453 | 4/1987 | Japan | 293/109 |

Primary Examiner—Margaret A. Focarino
Assistant Examiner—Joseph D. Pape
Attorney, Agent, or Firm—Evenson, Wands, Edwards, Lenahan & McKeown

[57] ABSTRACT

A motor vehicle bumper has a crossmember fixed to the body and an impact-confronting collision part. Non-regenerable deformation members are arranged between the collision part and the crossmember, at least in the region of support points, and the impact-confronting collision part is secured to the crossmember via fastening bolts passing through the deformation members. During a deformation of the non-regenerable deformation members, the collision part is displaceable in the longitudinal direction of the vehicle in order to increase the deformation capacity, while preserving the indicator effect of the support points. The collision part is designed as a trim part encasing, at least in the region of the support points, a core consisting of elastically deformable foam. With the exception of the region of the support points, the bumper has a gap on the energy-absorber side. Each fastening bolt is surrounded by a spacer sleeve supported, at one end, on the head underside if the sleeve and, at the other end, on the crossmember fixed to the body.

1 Claim, 1 Drawing Sheet

MOTOR VEHICLE BUMPER

BACKGROUND AND SUMMARY OF THE INVENTION

The present invention relates to a bumper for a motor vehicle, and, more particularly, to a bumper with a crossmember fixed to the body and with an impact-confronting collision part. Furthermore, the bumper includes deformation members arranged between the collision part and the crossmember, at least in the region of support points. The impact-confronting collision part is secured to the crossmember via fastening bolts passing through the deformation members in the longitudinal direction of the vehicle, continence to hold the bumper.

A bumper arrangement is known as shown in German Offenlegungsschrift 2,413,772, in which energy absorption by prestressed honeycombed deformation members occurs in response to a relatively sharp impact and in which, after the effect of an impact, a loose fastening point indicates that the associated deformation member is permanently deformed and needs replacing.

The object of the present invention is to provide, while preserving the indication of a deformation member permanently deformed after the effect of an impact which is capable of exerting an energy-absorbing effect, even at relatively low collision speeds, and in which, for a further increase in the range if energy absorption, the deformation members provide their full energy absorption capacity as required.

The foregoing object has been achieved in accordance with the present invention by providing, an impact-confronting collision part in the form of a viscoplastic material trim part encasing, at least in the region of support points, a core of elastically deformed foam. With the exception of the region of the support points, the bumper has a gap on the energy-absorber side relative to the crossmember fixed to the body. Each fastening is surrounded by a spear sleeve bumper. The elastically deformable foam, which after some time resumes its initial position, exerts its energy-absorbing effect even in response to only small impacts, and after its energy-absorption capacity has been exhausted the permanent deformation of the deformation members, of which the extent of deformation is not restricted by an applied prestress, commences. The gap formation adjacent to the support points ensures that a permanently deformed deformation member is indicated by a loose fastening, so that a replacement of the corresponding deformation member can be carried out.

BRIEF DESCRIPTION OF THE DRAWINGS

These and other objects, features and advantages will become more apparent from the following detailed description of a presently preferred embodiment of the present invention when taken in conjunction with the accompanying drawing wherein.

DETAILED DESCRIPTION OF THE DRAWINGS

Figure 1:
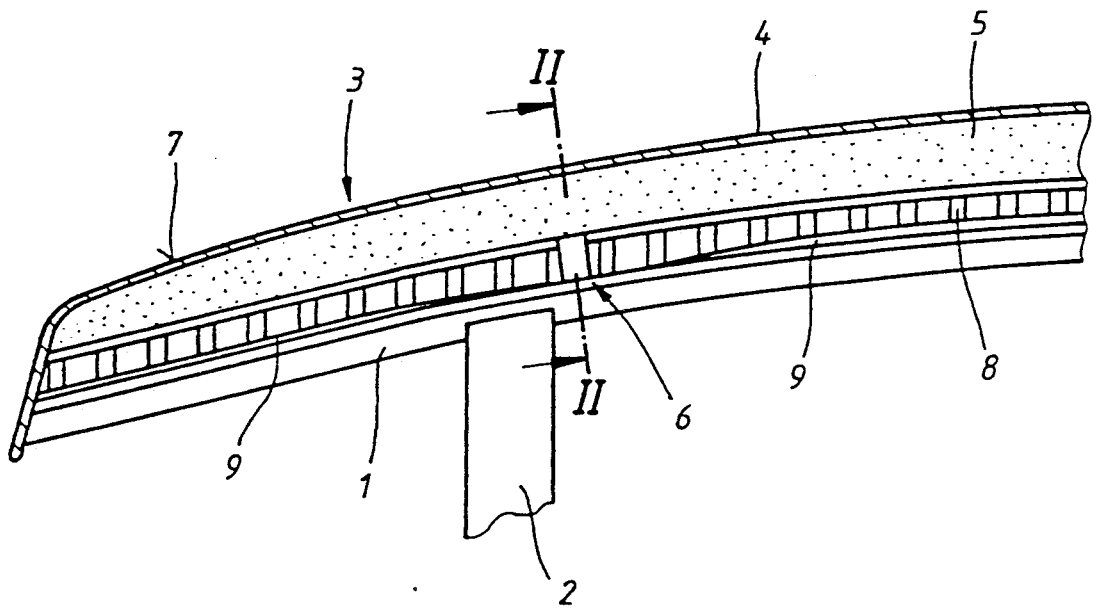
FIG. 1 is a simplified sectional position of a front bumper, in plan view, in the region of a support point, in a section taken in the direction of principal extension.

According to FIG. 1, an elongated front crossmember 1 is connected firmly to two front side members 2, of which only one side member is shown. The front crossmember 1 is preceded by an elongated bumper 3 having an impact-confronting collision part 4 which is designed as a trim part 7 made of a viscoplastic material, surrounding, at least in the region of support points 6, of which only one support point can be seen, a core 5 consisting of an elastically deformable foam.

The core 5 is followed in the direction of impact by a honeycombed non regenerable deformation member 8 which, in the exemplary embodiment illustrated in FIG. 1, extends over the entire length of the bumper 3 and which is appropriately composed of individual portions. In the region of each support point 6, the deformation member 8 bears on the crossmember 1, and adjacent to this on both sides there is a gap 9 relative to the crossmember 1. If, in a modified embodiment of FIG. 1, a nonregenerable deformation member 8 is provided only in the region of each support point 6, then the core 5 consisting of elastically deformable foam reaches just in front of the crossmember 1, to form a gap corresponding to the gap 9.

Figure 2:
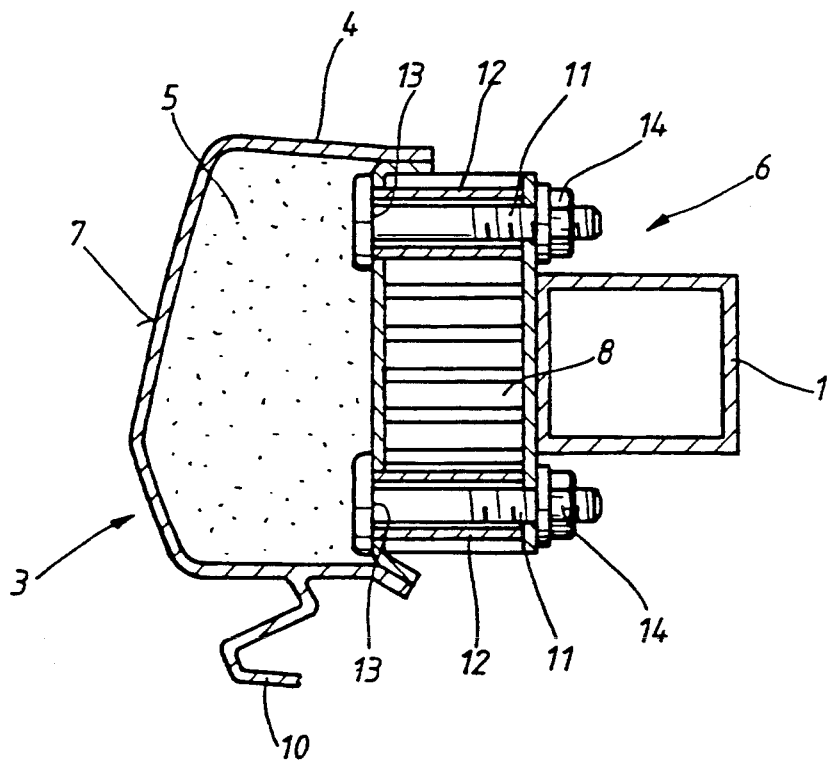
FIG. 2 is a supplemented sectional elevation view taken along the line II—II in FIG. 1.

As is apparent from FIG. 2, in the region of each support point 6, the trim part 7 encasing the core 5 and continued downwards into a skirt 10 is supported on the crossmember 1 via the deformation member 8. Fastening bolts 11 are surrounded by spacer sleeves 12 and provide for retention. These spacer sleeves 12 and the fastening bolts 11 pass through the deformation member 8. Each fastening bolt 11 is supported with its head underside 13 on one end face of the spacer sleeve 12, and its other end face bears on the crossmember 1 upon tightening of a nut 14 assigned to each of the fastening bolts 11. The length of each spacer sleeve 12 is coordinated with the thickness of the deformation member 8 in such way that, at the end of the fastening operation, the deformation member 8 is clamped without any reduction of its energy-absorption capacity.

In the event of a collision, even only small impacts are absorbed by the core 5 consisting of elastically deformable foam. The deformation member 8 takes effects only at high collision speeds, with the permanent deformation first commencing at the impact-confronting support point 6. When the deformation has progressed to such an extent that the deformation member 8 is compressed by the amount of the gap 9, the deformation member 8 bears over its surface against the crossmember 1. After the end of the impact, the connection between the bumper 3 and crossmember 1 is maintained, but a loose fastening point indicates that a permanent deformation of the deformation member 8 has occurred in the region of the support point 6 and that the deformation member 8 must now be replaced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An elongated bumper for a motor vehicle, comprising a cross-member fixed to a vehicle body and to an elongated impact-confronting collision part, an elongated non-regenerable deformation member arranged between said collision part and said cross-member and said collision part being secured to said cross-member by a plurality of setbolts located at least one point along the bumper and passing through said deformation member and defining a support region on both sides of said plurality of setbolts, wherein said non-regenerable deformation member contacts said cross-member only in the support region and defines a gap along the remaining regions of the bumper with respect to the cross-member, each setbolt being surrounded by a spacer sleeve having end faces, one end face of which supports itself on said cross-member and the other end face of which is acted upon by the underside of a head of each setbolt and said impact-confronting collision part is a viscoplastic material trim part encasing an elastically deformable foam core.

* * * * *